United States Patent [19]

Chou et al.

[11] Patent Number: 5,367,534
[45] Date of Patent: Nov. 22, 1994

[54] SYNCHRONOUS FLOW CONTROL METHOD

[75] Inventors: Wei-Tai Chou, Hazel Green; Fred C. Killmeyer, Huntsville, both of Ala.

[73] Assignee: Universal Data Systems, Inc., Huntsville, Ala.

[21] Appl. No.: 78,943

[22] Filed: Jun. 16, 1993

[51] Int. Cl.$^5$ .................. H04B 1/38; H04L 25/36
[52] U.S. Cl. ........................... 375/8; 375/106; 375/118; 375/121
[58] Field of Search ............ 375/8, 10, 106, 118, 375/121; 370/17, 60, 79, 94.1, 100.1, 102, 108; 340/825.14, 825.15, 825.2; 455/73

[56] References Cited

U.S. PATENT DOCUMENTS

| | | | |
|---|---|---|---|
| 4,847,867 | 7/1989 | Nasu et al. | 375/106 |
| 4,884,269 | 11/1989 | Duncanson et al. | 375/121 |
| 4,964,141 | 10/1990 | Matsushima et al. | 375/106 |
| 5,033,064 | 7/1991 | Upp | 375/118 |
| 5,099,477 | 3/1992 | Taniguchi et al. | 375/118 |
| 5,138,634 | 8/1992 | Knapp | 375/106 |

*Primary Examiner*—Stephen Chin
*Assistant Examiner*—Young Tse
*Attorney, Agent, or Firm*—Wayne J. Egan

[57] ABSTRACT

A flow control method (200) is suitable for use with a synchronous modem (101). The modem clocks data signals (107) from the terminal under control of a clock signal (109) supplied by the modem. The clock signal operates at a clock rate. The modem stores the data signals in a buffer (111), and thereupon transmits the data signals to a channel, the channel operating at a channel rate. When the quantity of data signals stored in the buffer exceeds a maximum threshold, the modem removes the clock signal from the terminal, thereby interrupting the flow of data signals from the terminal. When the quantity of data signals stored in the buffer is less than a minimum threshold, the modem again applies the clock signal to the terminal, thereby restoring the flow of data signals from the terminal.

10 Claims, 1 Drawing Sheet

SYNCHRONOUS FLOW CONTROL METHOD

FIELD OF THE INVENTION

This application relates to flow control methods including, but not limited to, a synchronous flow control method.

BACKGROUND OF THE INVENTION

It is known to use a synchronous modem or data communications equipment ("DCE") to synchronously transmit data signals to a communications channel at a fixed rate. In a typical arrangement, the synchronous DCE will first receive data signals from a synchronous terminal or data terminal equipment ("DTE"), store the data signals in a buffer, and thereafter transmit the data signals to the channel. (In what follows, the term "DTE" is used interchangeably with "terminal"; also, the term "DCE" is used interchangeably with "modem.")

In such arrangements, the modem receives the data from the terminal at the same rate used by the modem to transmit data to the channel, that is, the channel rate. Thus, the flow of signals between the terminal and the modem must equal the channel rate. If the optimum rate for the terminal and modem to exchange data is significantly different from the channel rate, this results in the modem and/or the terminal being forced to operate at an inefficient rate. What is needed, therefore, is a method which would allow the modem to control the flow of data signals from the terminal. With such an arrangement, the modem and the terminal would be able to exchange data signals at a bit rate different from the rate of the synchronous channel.

DESCRIPTION OF THE PREFERRED EMBODIMENT

Figure 1:
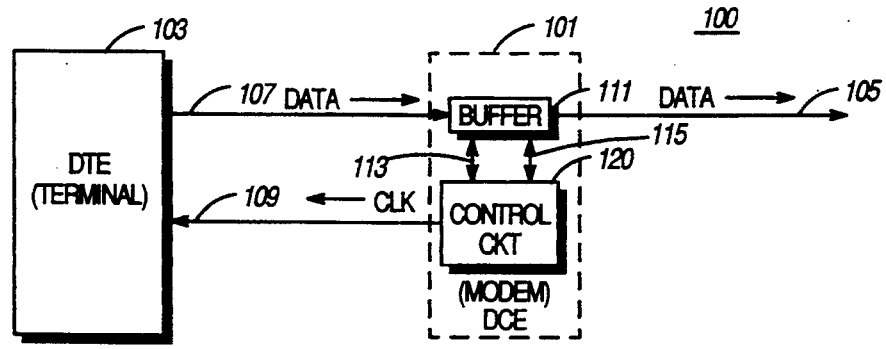
FIG. 1 is a block diagram that shows a modem 101 suitable for demonstrating a first embodiment of a synchronous flow control method, in accordance with the present invention.

Referring now to FIG. 1, there is shown a DCE or modem 101 arranged with a first embodiment of a synchronous flow control method, in accordance with the present invention. The modem 101 includes a buffer 111 and a control circuit 120. The modem 101 is coupled to a DTE or terminal 103 by means of a data path 107 and a clock signal path 109. The terminal 103 is arranged for transmitting data signals to the modem 101 via the path 107, under control of the clock signal 109. As shown, the clock signal 109 is controlled by the modem control circuit 120.

Still referring to FIG. 1, the modem is arranged for receiving the data signals received from the terminal on path 107 and storing the signals in the buffer 111. As above, the data receiving and storing is performed at a first rate, under control of the clock signal 109. After the data signals are stored in the buffer 111, the modem is arranged for transmitting the stored data signals from the buffer 111 to a coupled channel 105 at a second rate. In one embodiment, the second rate, i.e., the rate of the clock signal 109, may be greater than the first rate, i.e., the rate of the channel 105. Also, the data signals may be formatted in a synchronous data link protocol such as, for example, the HDLC ("Highlevel Data Link Control") data link protocol, or the SDLC ("Synchronous Data Link Control") data link protocol, or another protocol.

The buffer 111 is arranged to compare the quantity of data signals stored therein with a maximum threshold and a minimum threshold. When the quantity of data signals stored in the buffer exceeds the maximum threshold, the buffer 111 informs the control circuit 120 of this first condition via the path 113. In response, the control circuit 120 removes the clock signal 109 from the terminal, thereby interrupting the flow of data signals from the terminal.

Once the terminal 103 has ceased transmitting the data signals 107 to the buffer 111, the modem 101 will continue removing data signals from the buffer 111 and applying them to the channel 105 for transmission to a remote point (not shown). As a result, the quantity of data signals stored in the buffer will gradually decrease with time. When the quantity of data signals stored in the buffer is less than the minimum threshold, the buffer 111 informs the control circuit 120 of this second condition via the path 115. In response, the control circuit 120 again applies the clock signal to the terminal, thereby restoring the flow of data signals from the terminal to the modem via the path 107.

Figure 2:
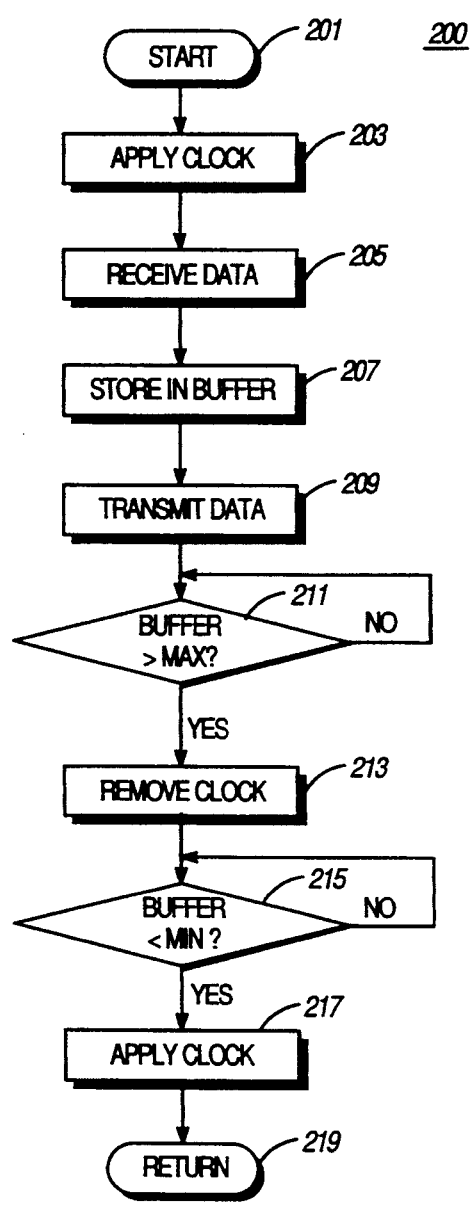
FIG. 2 is a flow diagram for FIG. 1.

Referring now to FIG. 2, there is shown a flow diagram for the DCE or modem 101 of FIG. 1. The process starts 201, and then proceeds to apply the clock signal 109 to the DTE or terminal 103. In response, the terminal 103 will begin transmitting data signals to the modem via the path 107.

The process next receives the data signals, step 205, and stores them in the buffer 111, step 207.

The process next begins transmitting the stored data signals from the buffer 111 to the channel 105, step 209. In response, the quantity of data signals stored in the buffer 111 will increase.

The process next determines when the quantity of data signals stored in the buffer 111 exceeds the maximum threshold, step 211. When the maximum threshold is exceeded, the process goes to step 213.

In step 213, the process removes the clock signal 109 from the terminal. In response, the terminal 103 will cease transmitting data signals to the modem via the path 107. The modem will, however, continue transmitting the stored data signals from the buffer 111 to the channel 105. In response, the quantity of data signals stored in the buffer 111 will decrease.

The process next determines when the quantity of data signals stored in the buffer 111 is less than the minimum threshold, step 215. When the number of stored data signals is less than the minimum threshold, the process goes to step 217.

In step 217, the process again applies the clock signal 109 to the terminal. In response, the terminal 103 will restore the flow of data signals to the modem via the path 107. The process then returns, step 219.

Figure 3:
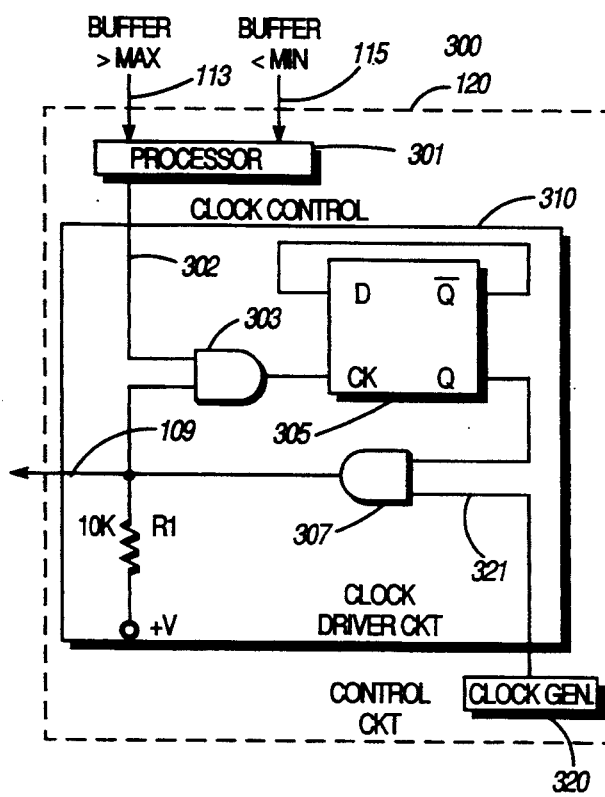
FIG. 3 shows further detail for FIG. 1.

Turning now to FIG. 3 there is shown further detail for the control circuit 120 of the modem 101 in FIG. 1. As shown, the signals 113 and 115 are coupled to a processor 301. In one embodiment, the signal 113 may comprise a first interrupt signal which is generated by the buffer 111 when the number of data signals stored therein exceeds the maximum threshold. Also, the signal 115 may comprise a second interrupt signal which is generated by the buffer 111 when the number of data signals stored therein is less than the minimum threshold.

The processor 301 may comprise a suitable microprocessor which is suitably programmed in accordance with the flow diagram of FIG. 2. As shown, the control circuit 120 includes a clock generator 320 with clock output 321 and a clock driver circuit 310. In one embodiment, the clock generator 320 provides a 19.2 KHz clock signal at the output lead 321. The processor 301 provides a clock control output 302 which acts to control the flow of clocking signals from the lead 321 to the path 109 by means of a clock driver circuit 310.

Referring now to the clock driver circuit 310, it is seen the clock driver circuit 310 acts as a gate for the clock generator 320 output signal 321. As shown, the clock driver circuit comprises a first gate 303, a second gate 307, a flip-flop 305, and a biasing resistor R1, all connected as shown. Those skilled in the art will appreciate that it is possible to implement other equivalent embodiments of the clock driver circuit 310, without departing from the teachings of the present invention.

Thus there is disclosed a flow control method that is suitable for use with a synchronous modem. Thus, in accordance with a synchronous flow control method, in accordance with the present invention, a modem clocks data signals from the terminal under control of a clock signal supplied by the modem. The clock signal operates at a clock rate. The modem stores the data signals in a buffer, and thereupon transmits the data signals to a channel, the channel operating at a channel rate. When the quantity of data signals stored in the buffer exceeds a maximum threshold, the modem removes the clock signal from the terminal, thereby interrupting the flow of data signals from the terminal. When the quantity of data signals stored in the buffer is less than a minimum threshold, the modem again applies the clock signal to the terminal, thereby restoring the flow of data signals from the terminal. In one embodiment, the clock rate may exceed the channel rate.

One key advantage of a synchronous flow control method, in accordance with the present invention, is that it allows the DTE or terminal to transfer data to the DCE or modem at a bit rate different from the rate of the channel. Thus, the terminal and modem can exchange data at a rate much higher than the channel rate. As a result, the terminal and modem can exchange a large amount of data in a relatively short period of time, thus resulting in a more efficient allocation of the processor resources of the terminal and modem.

While various embodiments of a synchronous flow control method, in accordance with the present invention, have been described hereinabove, the scope of the invention is defined by the following claims.

What is claimed is:

1. In a modem arranged for coupling to a channel and further arranged for coupling to a data terminal, the modem arranged for transmitting a clock signal to the terminal at a clock rate, the modem including a buffer and arranged for receiving data signals from the terminal based on the clock signal and for storing the data signals in the buffer and for transmitting the data signals from the buffer to the channel at a channel rate, a method for the modem to control the flow of data signals from the terminal, the method comprising the steps of: at the modem:
   (a) applying the clock signal to the terminal;
   (b) receiving data signals from the terminal;
   (c) storing the data signals n the buffer;
   (d) transmitting the data signals from the buffer to the channel;
   (e) determining when the quantity of data signals stored in the buffer exceeds a maximum threshold; and,
   (f) when the quantity of data signals stored in the buffer exceeds the maximum threshold, removing the clock signal from the terminal, thereby interrupting the flow of data signals from the terminal.

2. The method of claim 1, including the further step of:
   (g) determining when the quantity of data signals stored in the buffer is less than a minimum threshold.

3. The method of claim 2, including the further step of:
   (h) when the quantity of data signals stored in the buffer is less than the minimum threshold, applying the clock signal to the terminal, thereby restoring the flow of data signals from the terminal.

4. The method of claim 3, wherein the data signals are formatted in a synchronous data link protocol.

5. The method of claim 4, wherein the clock rate is greater than the channel rate.

6. A modem arranged for coupling to a channel and further arranged for coupling to a data terminal, the modem arranged for transmitting a clock signal to the terminal at a clock rate, the modem including a buffer and arranged for receiving data signals from the terminal based on the clock signal and for storing the data signals in the buffer and for transmitting the data signals from the buffer to the channel at a channel rate, the modem arranged for controlling the flow of data signals from the terminal in accordance with a predetermined method, the predetermined method comprising the steps of:
   (a) applying the clock signal to the terminal;
   (b) receiving data signals from the terminal;
   (c) storing the data signals in the buffer;
   (d) transmitting the data signals from the buffer to the channel;
   (e) determining when the quantity of data signals stored in the buffer exceeds a maximum threshold; and,
   (f) when the quantity of data signals stored in the buffer exceeds the maximum threshold, removing the clock signal from the terminal, thereby interrupting the flow of data signals from the terminal.

7. The modem of claim 6, the method including the further step of:
   (g) determining when the quantity of data signals stored in the buffer is less than a minimum threshold.

8. The modem of claim 7, the method including the further step of:
   (h) when the quantity of data signals stored in the buffer is less than the minimum threshold, applying the clock signal to the terminal, thereby restoring the flow of data signals from the terminal.

9. The modem of claim 8, wherein the data signals are are formatted in a synchronous data link protocol.

10. The modem of claim 9, wherein the clock rate is greater than the channel rate.

* * * * *